United States Patent
Figger

(10) Patent No.: US 9,736,976 B2
(45) Date of Patent: Aug. 22, 2017

(54) WINDROWER WITH QUICK HEADER ATTACHMENT

(71) Applicant: AGCO Corporation, Hesston, KS (US)

(72) Inventor: Robert L. Figger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 99 days.

(21) Appl. No.: 14/874,625

(22) Filed: Oct. 5, 2015

(65) Prior Publication Data

US 2016/0128261 A1    May 12, 2016

Related U.S. Application Data

(60) Provisional application No. 62/077,087, filed on Nov. 7, 2014.

(51) Int. Cl.
| | | |
|---|---|---|
| *A01B 51/00* | (2006.01) | |
| *A01B 59/00* | (2006.01) | |
| *A01B 59/06* | (2006.01) | |
| *A01D 67/00* | (2006.01) | |

(52) U.S. Cl.
CPC .......... *A01B 59/006* (2013.01); *A01B 59/064* (2013.01); *A01D 67/005* (2013.01)

(58) Field of Classification Search
CPC ... A01B 59/062; A01B 59/006; A01B 71/063; A01B 59/06; A01B 59/067; A01B 63/118; A01B 71/06; A01D 41/145; A01D 41/16; B60D 1/04; B60D 1/141; B60D 1/28
USPC ........................................................ 172/272
See application file for complete search history.

(56) References Cited

U.S. PATENT DOCUMENTS

| | | | | |
|---|---|---|---|---|
| 3,172,686 A | * | 3/1965 | Beard | A01B 59/062 |
| | | | | 172/272 |
| 3,324,637 A | * | 6/1967 | Windsor | A01D 41/16 |
| | | | | 56/15.6 |
| 3,431,711 A | * | 3/1969 | Claas | A01D 41/12 |
| | | | | 56/14.5 |

(Continued)

FOREIGN PATENT DOCUMENTS

| | | |
|---|---|---|
| DE | 102013110688 A1 | 3/2015 |
| EP | 1762404 A2 | 3/2007 |

(Continued)

OTHER PUBLICATIONS

Intellectual Property Office, International Search report for related UK Application No. GB14209613, dated May 20, 2015.

*Primary Examiner* — Árpád Fábián-Kovács

(57) ABSTRACT

An agricultural work vehicle is operable to be advanced along the ground to sever a swath of standing forage plants and to lay the severed forage material into a windrow. The agricultural work vehicle includes a powered chassis, a harvesting header, and a quick-attachment header adapter. The header adapter is shiftably supported by the powered chassis and is configured to selectively support the harvesting header. The header adapter includes an adapter frame, having end supports and a center support, and a selectively actuatable latch assembly supported on the adapter frame. The latch assembly is associated with at least one of the supports to releasably secure the harvesting header to the adapter frame when the latch assembly is engaged and permit disconnection from the adapter frame when the latch assembly is disengaged.

9 Claims, 6 Drawing Sheets

(56) References Cited

U.S. PATENT DOCUMENTS

| | | | | |
|---|---|---|---|---|
| 3,488,930 A * | 1/1970 | Feldmann | A01D 41/16 | 56/11.9 |
| 3,498,638 A * | 3/1970 | Magruder | A01B 59/062 | 172/272 |
| 3,531,140 A * | 9/1970 | Fadden | A01B 59/062 | 172/275 |
| 3,561,789 A * | 2/1971 | Stikeleather | A01B 59/062 | 172/272 |
| 3,829,128 A * | 8/1974 | Sutton | B60D 1/141 | 172/272 |
| 3,977,698 A * | 8/1976 | von Allworden | B60D 1/04 | 172/272 |
| 4,018,451 A * | 4/1977 | Geisthoff | B60D 1/141 | 172/439 |
| 4,050,715 A * | 9/1977 | von Allworden | B60D 1/04 | 280/508 |
| 4,090,725 A * | 5/1978 | Perin | A01B 59/062 | 172/272 |
| 4,147,374 A * | 4/1979 | Jeffes | B60D 1/04 | 280/478.1 |
| 4,176,727 A * | 12/1979 | Perin | A01B 59/062 | 172/125 |
| 4,280,317 A * | 7/1981 | Lindblom | A01D 41/16 | 56/15.6 |
| 4,398,745 A * | 8/1983 | Azzarello | B60D 1/04 | 280/508 |
| 4,415,175 A * | 11/1983 | Kainer | A01B 59/062 | 172/272 |
| 4,549,744 A * | 10/1985 | Herr | B60D 1/04 | 172/272 |
| 4,707,972 A * | 11/1987 | Knepper | A01D 41/14 | 460/16 |
| 4,887,680 A * | 12/1989 | Nozaka | A01B 71/063 | 172/272 |
| 5,029,650 A * | 7/1991 | Smit | A01B 59/062 | 172/272 |
| 5,303,790 A * | 4/1994 | Coleman | A01B 71/063 | 172/272 |
| 6,062,319 A * | 5/2000 | Schwalenberg | A01B 59/06 | 172/272 |
| 6,349,959 B2 * | 2/2002 | Schlegel | A01B 59/006 | 116/284 |
| 6,519,923 B1 * | 2/2003 | Cooksey | A01B 71/08 | 56/14.9 |
| 6,619,020 B1 * | 9/2003 | Chaney | A01D 41/142 | 56/10.9 |
| 6,735,929 B2 * | 5/2004 | Watts | A01D 41/16 | 56/14.9 |
| 7,404,448 B2 * | 7/2008 | Tuttle | B60D 1/04 | 172/439 |
| 7,530,405 B2 * | 5/2009 | Kollath | A01B 59/006 | 172/272 |
| 7,575,077 B2 * | 8/2009 | Priepke | A01B 71/063 | 172/272 |
| 8,631,634 B2 * | 1/2014 | Vereecke | A01D 41/16 | 56/14.9 |
| 8,745,964 B2 * | 6/2014 | Patterson | A01D 43/04 | 56/15.8 |
| 2005/0012305 A1 * | 1/2005 | Wood | B60D 1/04 | 280/508 |
| 2006/0055140 A1 * | 3/2006 | Trefz | A01B 71/063 | 280/100 |
| 2010/0281837 A1 * | 11/2010 | Talbot | A01D 41/141 | 56/10.2 E |
| 2011/0047946 A1 * | 3/2011 | Otto | A01D 41/145 | 56/10.2 E |

FOREIGN PATENT DOCUMENTS

| | | |
|---|---|---|
| GB | 1036257 A | 7/1966 |
| GB | 2167634 A | 6/1986 |
| WO | 2013/071441 A1 | 5/2013 |

* cited by examiner

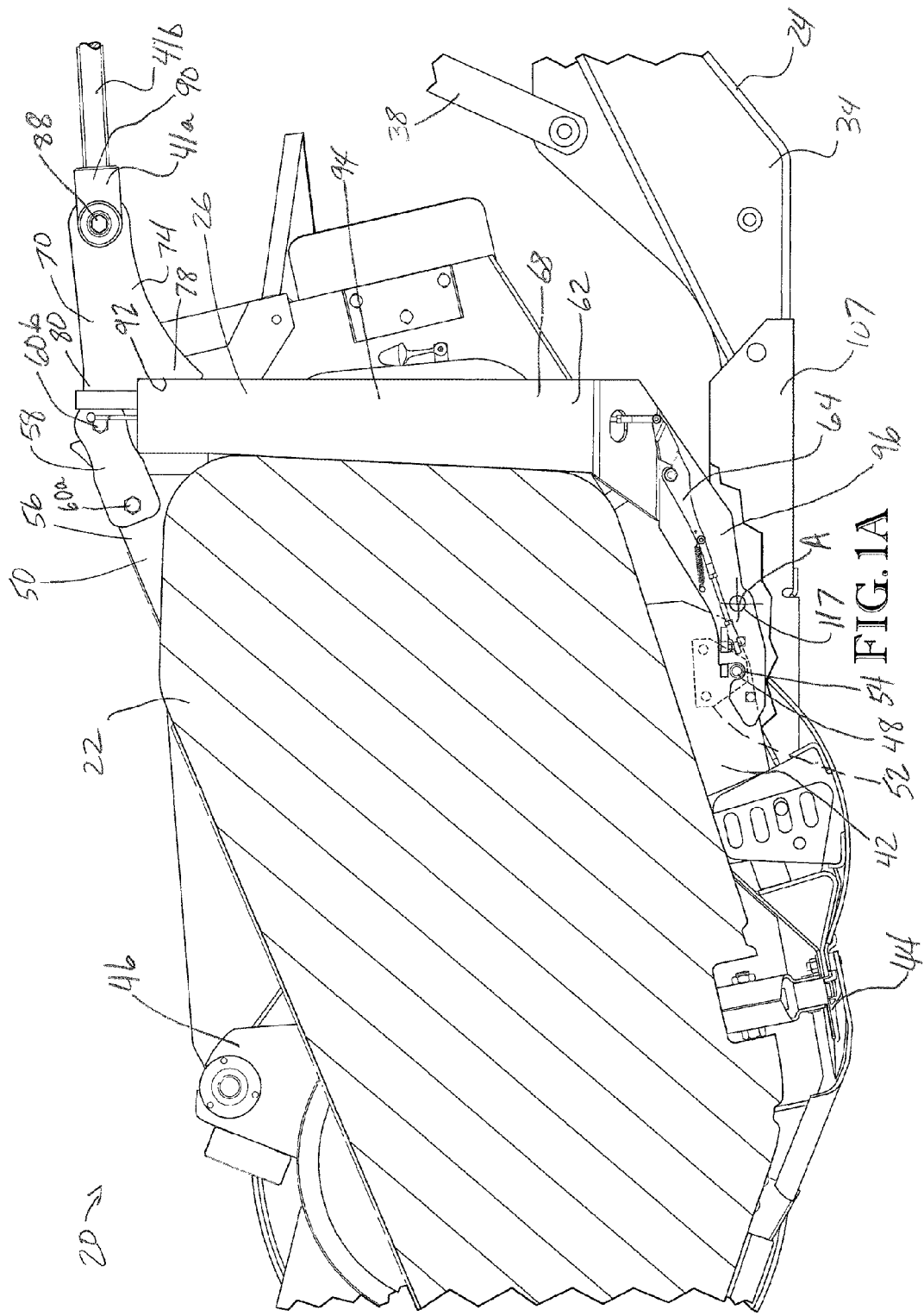

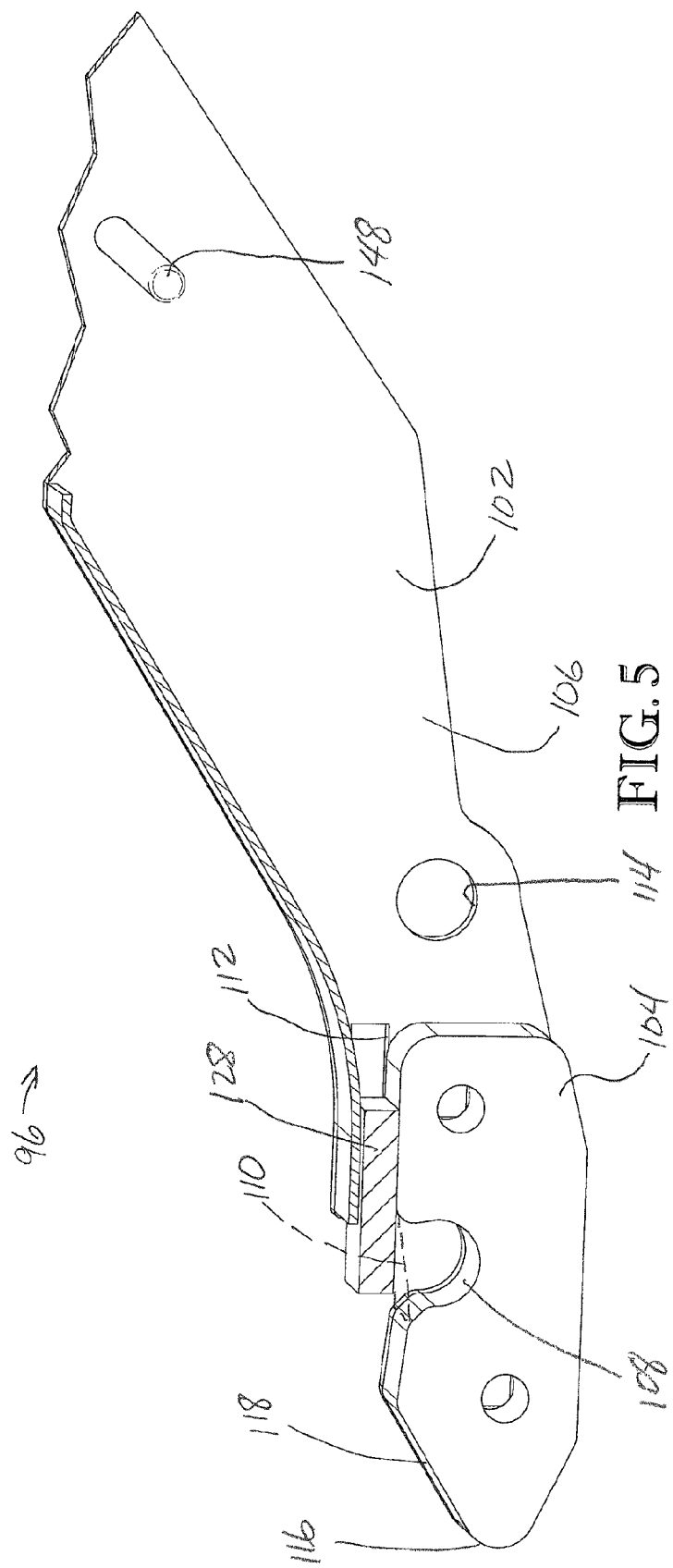

WINDROWER WITH QUICK HEADER ATTACHMENT

CROSS REFERENCE TO RELATED APPLICATION

This application claims the benefit of U.S. Provisional Application No. 62/077,087, filed Nov. 7, 2014, which is hereby incorporated by reference in its entirety.

BACKGROUND

Field

The present invention relates generally to agricultural equipment. More specifically, embodiments of the present invention concern an agricultural work vehicle with a header adapter that enables quick attachment and detachment of a header.

Discussion of Prior Art

Windrowers and other self-propelled harvesters have long been used to harvest a crop. A conventional windrower includes a laterally extending header supported by the windrower chassis. As the windrower is advanced along a field, the header severs a swath of standing forage plants, such as grasses, alfalfa, wheat, etc. The header also collects the severed forage material and discharges the material rearwardly onto the ground in the form of a windrow that extends behind the windrower. Prior art windrowers can employ different types of headers, including sickle headers and rotating disc headers.

However, prior art windrowers have certain deficiencies. For instance, a conventional windrower chassis has a pair of lower lift arms and an upper cylinder that are connected to the header with manually secured bolts or pins. The conventional structure used to connect a windrower chassis to a header causes the header attachment and detachment processes to be difficult for an operator. In particular, the processes of header attachment and detachment for conventional windrowers is known to be time consuming and physically demanding for the operator.

SUMMARY

The following brief summary is provided to indicate the nature of the subject matter disclosed herein. While certain aspects of the present invention are described below, the summary is not intended to limit the scope of the present invention.

Embodiments of the present invention provide an agricultural work vehicle with a quick-attachment header adapter that does not suffer from the problems and limitations of the prior art agricultural work vehicles set forth above.

A first aspect of the present invention concerns an agricultural work vehicle that broadly includes a powered chassis, a harvesting header, and a quick-attachment header adapter. The powered chassis is operable to be driven across the ground. The harvesting header is shiftably supported by and movable with the powered chassis forwardly across the ground to cut forage plants. The harvesting header includes a header frame with a pair of end connectors and a center connector located between the end connectors. The quick-attachment header adapter is shiftably supported by the powered chassis and is configured to selectively support the harvesting header. The header adapter includes an adapter frame and a selectively actuatable latch assembly supported on the adapter frame. The adapter frame includes a pair of laterally spaced end supports, each associated with one of the end connectors of the header frame, and a center support located laterally between the end supports and associated with the center connector of the header frame, with the connectors being at least in part supported on the supports. The latch assembly is associated with at least one of the supports to releasably secure the harvesting header to the adapter frame when the latch assembly is engaged and permit disconnection from the adapter frame when the latch assembly is disengaged.

A second aspect of the present invention concerns a quick-attachment header adapter operable to be shiftably supported by a powered agricultural work vehicle chassis and configured to selectively support a harvesting header. The header includes a header frame with a pair of end connectors and a center connector located between the end connectors. The header adapter broadly includes an adapter frame and a selectively actuatable latch assembly supported on the adapter frame. The adapter frame includes a pair of laterally spaced end supports, each operable to be associated with one of the end connectors of the header frame, and a center support located laterally between the end supports and operable to be associated with the center connector of the header frame, with the connectors being at least in part supported on the supports. The latch assembly is associated with at least one of the supports to releasably secure the harvesting header to the adapter frame when the latch assembly is engaged and permit disconnection from the adapter frame when the latch assembly is disengaged.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 1A is an enlarged fragmentary side elevation of the agricultural work vehicle shown in FIG. 1, particularly showing the header adapter connected to lift arms and a center cylinder of the powered chassis, and further showing center and end connectors of the header attached to center and end supports of the header adapter.

Figure 1:
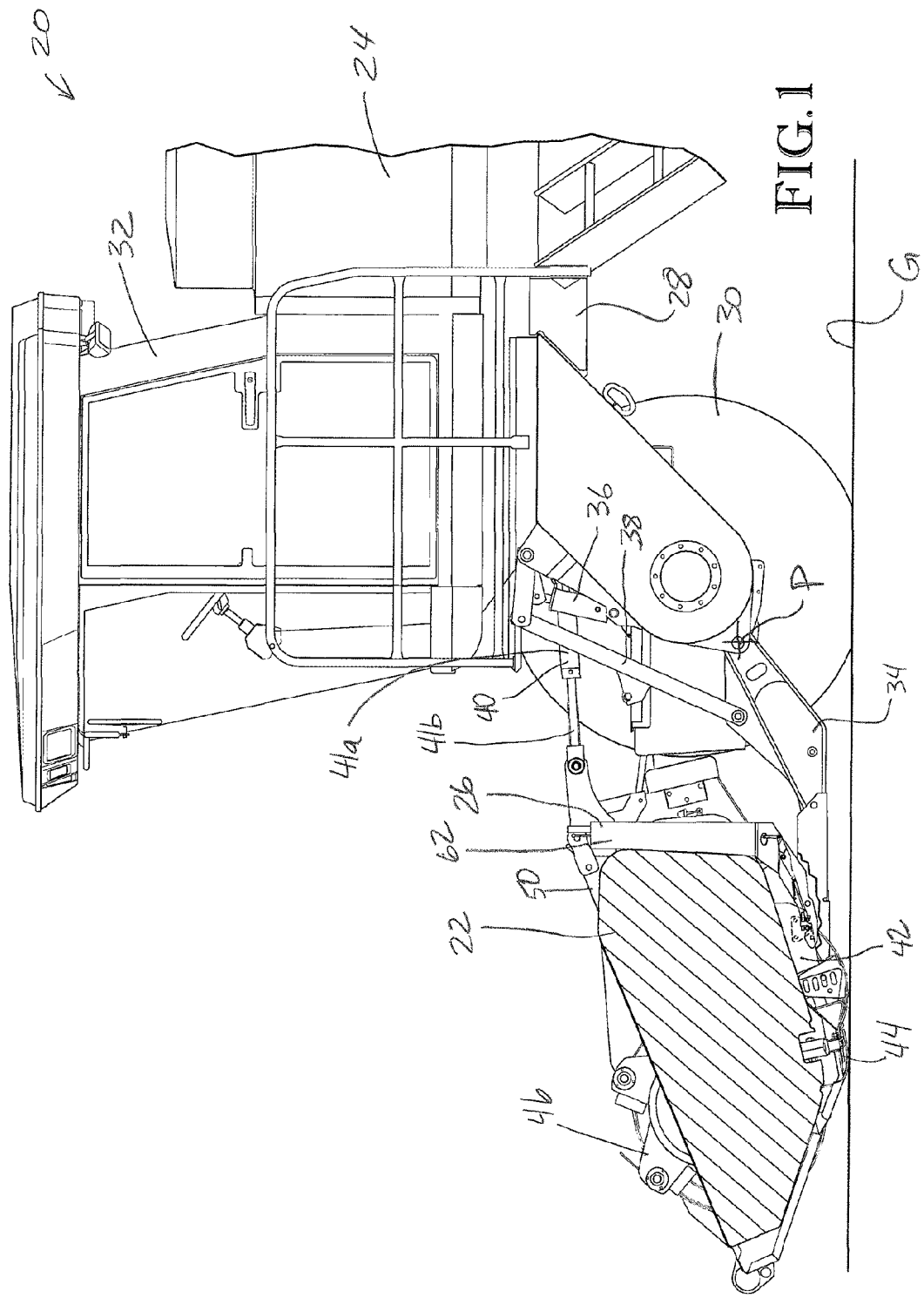
FIG. 1 is a fragmentary side elevation of an agricultural work vehicle constructed in accordance with a preferred embodiment of the present invention, with the agricultural work vehicle including a powered chassis, a header, and a header adapter.
Figure 2:
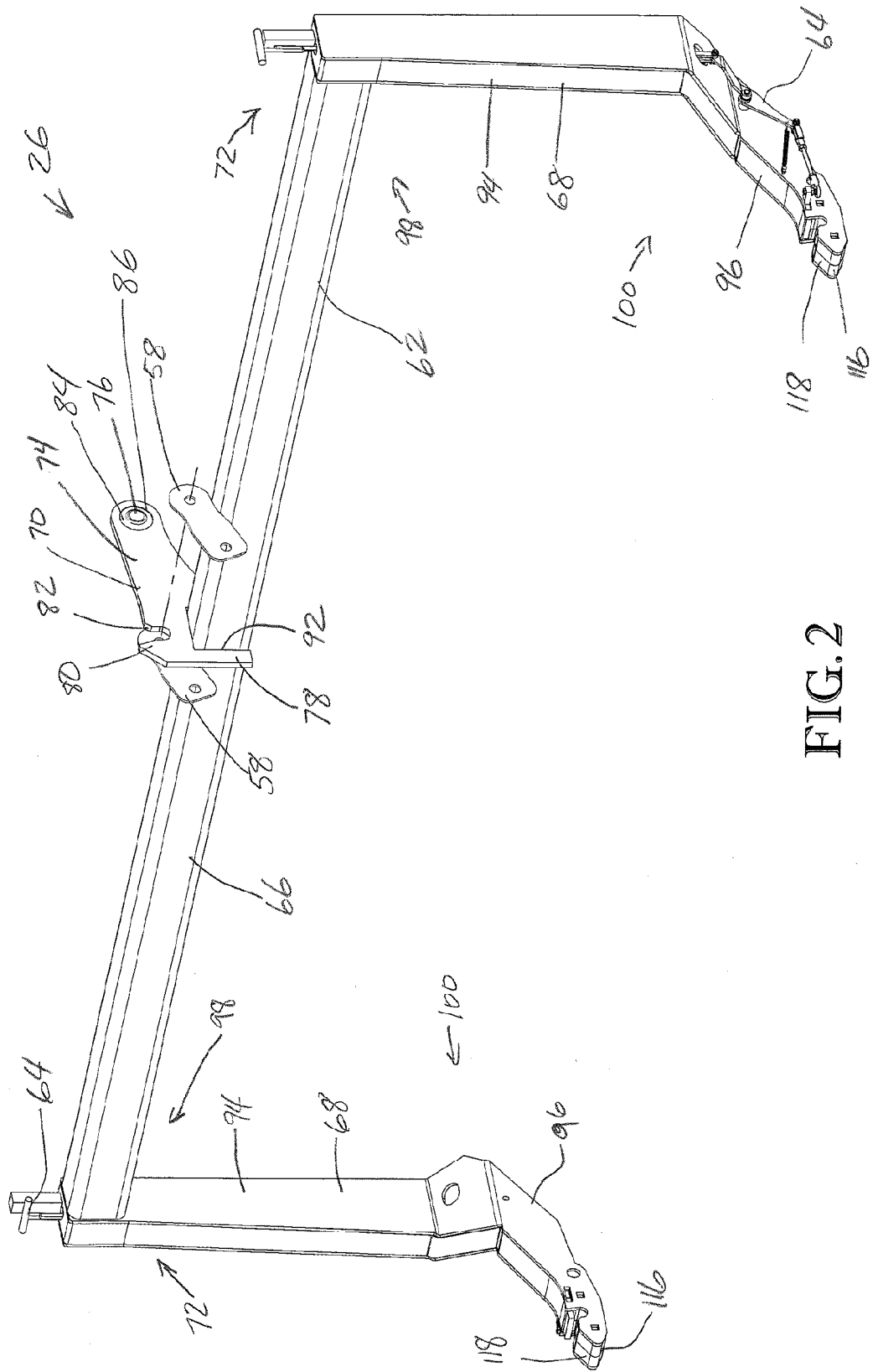
FIG. 2 is a fragmentary front perspective of the agricultural work vehicle shown in FIGS. 1 and 1A, showing the header adapter and part of the center connector of the header exploded from the center support of the header adapter, with the header adapter including an adapter frame and a pair of latch assemblies mounted on end supports of the adapter frame.
Figure 3:
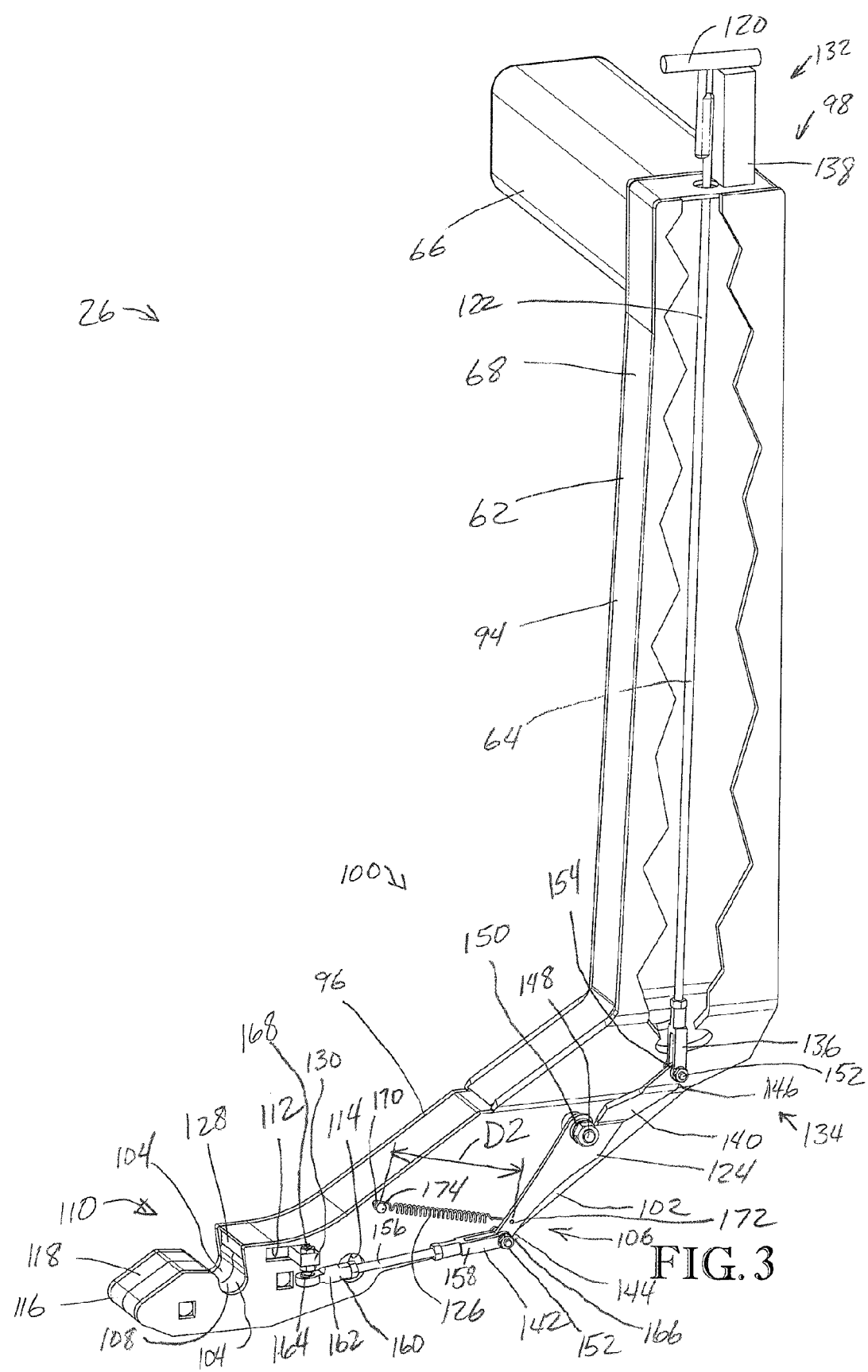
Figure 4:
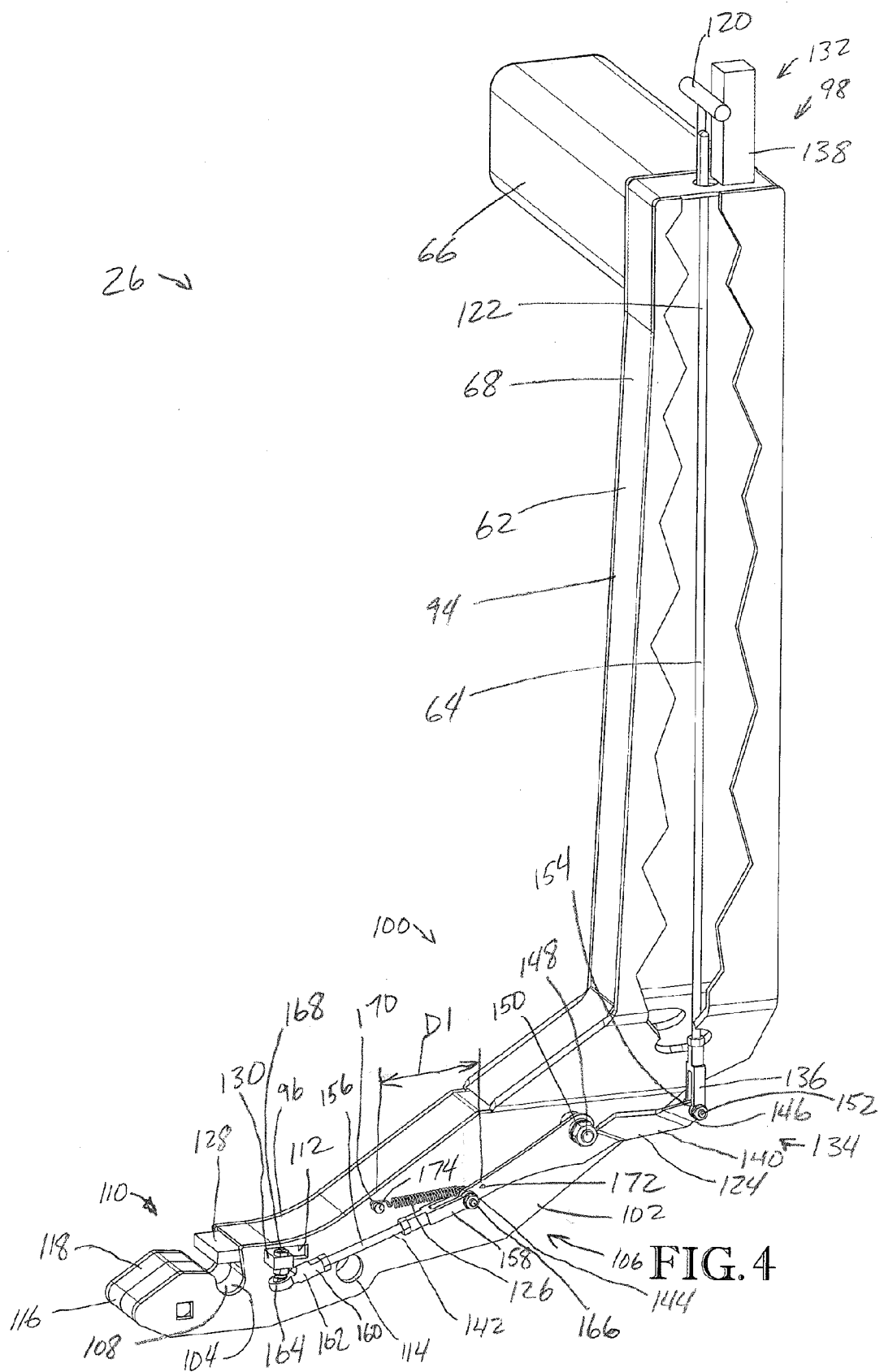

FIG. 3 is a fragmentary perspective of the header adapter shown in FIGS. 1, 1A, and 2, showing a portion of one end support broken away to depict the latch assembly passing through the end support, with the latch assembly including a handle, a rod, a linkage, a shiftable latch, and a spring, and showing the latch assembly in a disengaged condition where the latch is retracted within the end support in an open position;

FIG. 4 is a fragmentary perspective of the header adapter similar to FIG. 3, but showing the latch assembly in an engaged condition where the latch is extended from the end support in a closed position; and FIG. 5 is a fragmentary perspective of the header adapter shown in FIGS. 3 and 4, with a portion of the end support being broken away to show a jaw of the end support, with the jaw presenting a laterally extending jaw slot and a latch slot that slidably receives the latch.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION

Turning initially to FIGS. 1, 1A, and 2, an agricultural work vehicle 20 is constructed in accordance with a preferred embodiment of the present invention. In the embodiment described, the agricultural work vehicle 20 is a self-propelled windrower. However, it is within the ambit of the present invention where the agricultural work vehicle 20 is configured as another type of harvesting machine. For instance, aspects of the present invention could be incorporated into a grain harvesting combine (e.g., to provide quick attachment and detachment of a combine header). In the usual manner, the illustrated windrower 20 is designed to be advanced along the ground G to sever a swath of standing forage plants (such as grasses, alfalfa, wheat, etc.) and to lay the severed forage material into a windrow (not shown). As will be explained, the present invention permits quick attachment and detachment of a windrower header 22 relative to a powered chassis 24. The illustrated windrower 20 preferably includes the header 22, the powered chassis 24, and a quick-attachment header adapter 26.

Referring again to FIGS. 1, 1A, and 2, the powered chassis 24 provides a self-propelled agricultural vehicle to support and advance the header 22 along the ground G. In the usual manner, the powered chassis 24 preferably includes a frame 28, wheels 30, an engine (not shown), and an operator cab 32.

The powered chassis also preferably includes a pair of lift arms 34, end lift cylinders 36 to vertically position the lift arms 34, linkages 38, and a center cylinder 40. The center cylinder 40 preferably comprises a conventional hydraulic cylinder that includes a cylinder housing 41a and a piston 41b (see FIGS. 1 and 1A). The cylinder housing 41a is pivotally mounted relative to the frame 28 to pivot about a lateral pivot axis (not shown). In the usual manner, the piston 41b can be selectively extended and retracted relative to a cylinder housing. As will be discussed, the piston 41b of the center cylinder 40 can be extended and retracted relative to the housing 41a of the center cylinder 40 to selectively pivot the header adapter 26 and the header 22 about a lateral axis.

Each lift arm 34 is pivotally supported relative to the frame 28 at a pivot joint that permits the lift arm 34 to swing about a lateral pivot axis P (see FIG. 1). Thus, each lift arm 34 is permitted to swing about the pivot axis P and can be selectively swung by the corresponding end lift cylinder 36. In the illustrated embodiment, the linkages 38 drivingly interconnect each lift arm 34 with the corresponding end lift cylinder 36. The end lift cylinders 36 each preferably comprise a conventional hydraulic cylinder with a cylinder housing and piston that can be selectively extended and retracted relative to a cylinder housing. It will be appreciated that the illustrated lift arms 34, lift cylinders 36, and/or linkages 38 could be alternatively configured (e.g., to raise and lower the header 22) without departing from the scope of the present invention.

In the usual manner, the header 22 is preferably used to sever the forage plants as the header 22 is advanced over the ground G by the powered chassis 24. The header 22 also discharges the severed plant material rearwardly onto the ground G in the form of a windrow (not shown). Furthermore, the header 22 is shiftably supported by the powered chassis 24 to move up and down as the header 22 moves forwardly across the ground G to cut forage plants. The header 22 preferably comprises a sickle header and includes a header frame 42, a sickle assembly 44, and a reel 46 (see FIG. 1A).

The sickle assembly 44 is mounted to the header frame 42 and extends laterally along substantially the entire width of the header 22. The reel 46 is rotatably supported by the header frame 42 and also extends laterally. The reel 46 is positioned above the sickle assembly 44 to direct plants into engagement with the sickle assembly 44.

The illustrated header frame 42 preferably includes a pair of end connectors 48 and a center connector 50. Each end connector 48 is operable to be supported by one of the lift arms 34, with the center connector 50 being attached relative to the center cylinder 40.

Each of the end connectors 48 includes a pair of laterally spaced mounting plates 52 and a rod 54 that interconnects the mounting plates 52. The end connectors 48 are preferably mounted adjacent to respective lateral header ends presented by the header 22. The illustrated end connectors 48 are also preferably located adjacent a lowermost margin of the header frame 42 and are spaced forwardly of a rearmost margin of the header frame 42 (see FIG. 1A). However, the end connectors 48 could be alternatively configured or positioned without departing from the scope of the present invention.

The center connector 50 is located laterally between the end connectors 48 and provides a location where the header frame 42 can be attached relative to the center cylinder 40. The illustrated center connector 50 includes an upright flange 56 centrally mounted along the lateral length of the header frame 42. The center connector 50 further includes a pair of connector plates 58 and a fastener 60a used to attach the plates 58 to the flange 56. The plates 58 are elongated and present holes located adjacent to respective ends of the plates 58. The center connector 50 includes another fastener 60b that interconnects the plates 58. As will be discussed, the fastener 60b is removably attached to the header adapter 26.

However, it is within the ambit of the present invention where the center connector 50 is alternatively constructed and/or positioned relative to the remainder of the header frame 42. For instance, while the center connector 50 is laterally spaced about the same distance from each end connector 48, the center connector 50 could be laterally offset so as to be closer to one end connector 48 than the other end connector 48. The center cylinder 40 and center connector 50 are preferably laterally aligned with one another so that the center cylinder 40 is laterally spaced about the same distance from each end connector 48. However, it is also within the scope of the present invention where the center cylinder 40 is laterally offset so as to be closer to one end connector 48 than the other end connector 48.

Turning to FIGS. 1A-5, the header adapter 26 is configured to provide for quick attachment between the powered chassis 24 and the header 22. More particularly, the header adapter 26 is shiftably supported by the powered chassis 24 and is configured to selectively support the harvesting header 22. The header adapter 26 preferably includes an adapter frame 62 and a selectively actuatable latch assembly 64 supported on the adapter frame 62.

The adapter frame 62 preferably comprises a rigid, unitary structure that interconnects the powered chassis 24 and the header 22. The illustrated adapter frame 62 includes a laterally extending beam 66, a pair of laterally spaced end supports 68, and a center support 70. The beam 66 preferably comprises an elongated metal tube that presents opposite tube ends 72 and presents a generally square tubular cross section that is continuous along its length. However, the beam 66 could be alternatively constructed without departing from the scope of the present invention.

The center support 70 preferably interconnects the center connector 50 of the header 22 and the center cylinder 40. The illustrated center support 70 includes a support bracket 74 and a ball connector 76. The support bracket 74 comprises an elongated plate and includes a lower mounting section 78 and an upper hook 80 (see FIG. 2). The hook 80 presents an open hook slot 82 that opens upwardly to slidably receive the center connector 50.

In the illustrated embodiment, the center support 70 is preferably laterally aligned with the center cylinder 40 and the center connector 50. Thus, the center support 70 is laterally spaced about the same distance from each end support 68. However, it is within the ambit of the present invention where the center support 70 is laterally offset so as to be closer to one end support 68 than the other end support 68.

The support bracket 74 also presents a rear socket (not shown) that rotatably receives the ball connector 76. In the usual manner, the rear socket forms a spherically shaped interior surface (not shown) that receives and conforms to a spherical outer surface 84 of the ball connector 76 so that the ball connector 76 and the support bracket 74 cooperatively provide a ball coupling 86. The ball coupling 86 permits relative pivotal movement between the support bracket 74 and the ball connector 76 about each of three independent axes. The ball connector 76 preferably presents a bore to receive a pin 88 of the center cylinder 40. The pin 88 also extends through a coupling 90 of the piston 41b.

The support bracket 74 is preferably welded to the beam 66 by positioning the beam 66 within an opening 92 presented by the mounting section 78. The center support 70 is centrally located along the beam axis between the ends 72 of the beam 66. It will be appreciated that the center support 70 could be alternatively configured without departing from the scope of the present invention.

The pin 88 extends through and thereby interconnects the coupling 90 of the piston 41b and the ball connector 76. In this manner, the center support 70 is pivotally coupled to the piston 41b of the center cylinder 40. Thus, as the piston 41b of the center cylinder 40 is extended and retracted relative to the housing 41a of the center cylinder 40, the header adapter 26 pivots about a lateral axis.

Each of the end supports 68 preferably interconnects a corresponding one of the lift arms 34 and a corresponding one of the end connectors 48 of the header 22. Furthermore, as will be explained, the end supports 68 receive the latch assemblies 64. The illustrated end supports 68 each comprise unitary tubular structures that are generally mirror images of one another.

Each end support 68 includes an upright tube 94 and a forwardly extending jaw 96. The upright tube 94 extends vertically to present upper and lower ends 98,100. The lower end 100 preferably angles forwardly relative to the rest of the tube 94. Further, the lower end 100 also extends from the rest of the tube 94 in an inboard direction. The upright tube 94 is preferably hollow so as to receive part of the latch assembly 64 therein. Each of the upright tubes 94 is welded to a corresponding one of the tube ends 72. The illustrated upright tube 94 is preferred but could be alternatively configured consistent with the principles of the present invention. For example, the latch assemblies 64 could alternatively be located completely external to the end supports 68.

Turning to FIGS. 3-5, the jaw 96 preferably includes a jaw channel 102 and a pair of reinforcing jaw plates 104. The jaw channel 102 has a channel-shaped construction and presents a longitudinally extending trough 106. The jaw channel 102 is sized and shaped so that the trough 106 can removably receive part of an extension 107 of the corresponding lift arm 34, with the extension 107 being attached to the jaw channel 102 (see FIG. 1A). The jaw plates 104 are positioned alongside one another and are secured within the trough 106 with fasteners (not shown).

The illustrated jaw 96 presents a laterally extending jaw slot 108. The jaw slot 108 includes an open face 110 that permits the jaw slot 108 to slidably receive one of the end connectors 48. The jaw 96 also presents a latch slot 112 that projects rearwardly of the jaw slot 108. Arm mounting holes 114 are presented by the jaw 96 and are spaced behind the jaw slot 108. The jaw 96 also presents a rounded forwardmost jaw end 116 that projects forwardly of the jaw slot 108.

The arm mounting holes 114 are preferably axially aligned with adjacent extension holes (not shown) presented by the extension 107. A fastener (not shown) extends through the extension holes and the arm mounting holes 114 to removably secure the lift arm 34 to the corresponding jaw 96 and form a pivot joint 117 (see FIG. 1A). The fastener pivotally connects the lift arm 34 and the corresponding jaw 96 so that the pivot joint 117 permits limited pivotal movement therebetween about a laterally extending axis A (see FIG. 1A). For instance, as the piston 41b of the center cylinder 40 is extended or retracted, the pivot joint 117 allows the header adapter 26 to swing correspondingly about the axis A.

As will be explained further, the header adapter 26 provides a structural interface that permits quick attachment and detachment between the header 22 and the powered chassis 24. The header adapter 26 provides a structure that interconnects the lift arms 34 to one another and to the center cylinder 40. As a result, the header adapter 26 can largely remain connected to the lift arms 34 and the center cylinder 40, even when the header 22 is detached from the header adapter 26, although such use of the header adapter 26 is not required. The header adapter 26 is preferably connected to the lift arms 34 and the center cylinder 40 with conventional removable fasteners. However, it is within the ambit of the present invention where the header adapter 26 is alternatively connected to the lift arms 34 and/or the center cylinder 40.

With the header adapter 26 being pivotally attached to the lift arms 34 and the center cylinder 40, the end lift cylinders 36 can be extended and retracted to cooperatively raise and lower the entire header adapter 26 relative to the powered chassis 24. Furthermore, because the lift arms 34 are pivotally attached to the frame 28 to pivot about the axis P and the center cylinder 40 is pivotally mounted to pivot about a lateral axis (not shown), the header adapter 26, lift arms 34, and center cylinder 40 preferably operate as a four-bar linkage as the header adapter 26 is driven up and down relative to the frame 28.

Again, each lift arm 34 and the corresponding jaw 96 are pivotally connected to permit limited pivotal movement therebetween about the axis A (see FIG. 1A). Consequently, as the piston 41b of the center cylinder 40 is extended and retracted relative to the housing 41a of the center cylinder 40, the header adapter 26 correspondingly swings about the lateral axis A. The illustrated structure of the header adapter 26, lift arms 34, and center cylinder 40 is preferred so that the header adapter 26 is supported for selective up and down shifting movement relative to the frame 28. However, for some aspects of the present invention, the header adapter 26 could be alternatively supported relative to the frame 28 for up and down shifting movement.

Turning again to FIGS. 1A-5, each jaw 96 is preferably constructed to slidably receive a corresponding one of the end connectors 48 of the header 22. More particularly, the rod 54 can slide along an upper surface 118 of the jaw end 116 as the header adapter 26 is advanced forwardly into engagement with the header 22. However, it will be appreciated that the rod 54 may or may not come into engagement with the upper surface 118.

Once the rod 54 is positioned above the jaw slot 108 and is in fore-and-aft alignment with the jaw slot 108, the rod 54 can be advanced through the open face 110 and into the jaw slot 108. Similarly, when engaged with the jaw 96, the rod 54 can be selectively shifted through the open face 110 and out of engagement with the jaw slot 108. When the rod 54 is located in the jaw slot 108 and supported by the jaw 96, the end support 68 serves to support the header 22.

While the end supports 68 each preferably include the illustrated jaw 96 to support the header 22, it is within the ambit of the present invention where the end supports 68 are alternatively configured. For instance, each end support 68 could have a jaw 96 with an alternatively shaped jaw slot (e.g. where the jaw slot extends forwardly and presents an open face that faces forwardly).

The components of the adapter frame 62 are preferably formed of an alloy carbon steel. However, the adapter frame 62 could include other materials, such as aluminum, stainless steel, and/or a synthetic resin material.

Again, each lift arm 34 and the corresponding jaw 96 are pivotally connected to permit limited pivotal movement therebetween about the axis A (see FIG. 1A). Consequently, as the piston 41b of the center cylinder 40 is extended and retracted relative to the housing 41a of the center cylinder 40, the header adapter 26 correspondingly swings about the lateral axis A. The illustrated structure of the header adapter 26, lift arms 34, and center cylinder 40 is preferred so that the header adapter 26 is supported for selective up and down shifting movement relative to the frame 28. However, for some aspects of the present invention, the header adapter 26 could be alternatively supported relative to the frame 28 for up and down shifting movement.

To selectively engage the adapter frame 62 with the header 22, the powered chassis 24 and header adapter 26 are preferably advanced into engagement with the header 22 while the header is resting on the ground G or on another surface. More particularly, the header adapter 26 is preferably vertically positioned relative to the header 22 so that the hook 80 is spaced below the fastener 60b of the center connector 50 and the jaw ends 116 of each jaw 96 are spaced below the rods 54 of the corresponding end connectors 48. The header adapter 26 is also aligned fore-and-aft relative to the header 22 by moving the hook slot 82 is into fore-and-aft alignment with the fastener 60b and the jaw slots 108 into fore-and-aft alignment with the rods 54 of the corresponding end connectors 48. The step of aligning fore-and-aft the header adapter 22 relative to the header 22 can include the step of advancing the header adapter 22 along the forward direction and/or the step of orienting the header adapter 22 about a vertical axis relative to the header 22.

With the header 22 and header adapter 26 aligned, the header adapter 26 can be shifted upwardly into engagement with the header 22 so that the hook slot 82 engages the fastener 60b and the jaw slots 108 engages the rods 54 of the corresponding end connectors 48. Optionally, the latch assembly 64 may need to be disengaged so that the jaw slots 108 are open prior to the step of shifting the header adapter 26 into engagement with the header 22. With the header 22 and header adapter 26 engaged with one another, the latch assemblies 64 can then be engaged to secure the header 22, as will be discussed.

The step of vertically positioning the header adapter 26 relative to the header 22 is preferably done prior to the step of aligning fore-and-aft the header adapter 26 relative to the header 22, although the steps could be done at the same time. Yet further, one or both of these steps could be done multiple times in various orders to achieve fore-and-aft alignment between the header 22 and header adapter 26 prior to shifting the header adapter 26 upwardly into engagement with the header 22.

While the powered chassis 24 and header adapter 26 are preferably advanced to engage the header 22 while the header 22 is supported at rest, it will be understood that the header 22 could be moved into engagement with the header adapter 26 while the header adapter 26 is kept stationary.

The header 22 and header adapter 26 can also be selectively brought out of engagement with one another. If the latch assemblies 64 are engaged, the header and header adapter 26 are disengaged by first disengaging the latch assemblies 64. The header adapter 26 can then be lowered relative to the header 22 so that the fastener 60b is removed from the hook slot 82 and the rods 54 of the end connectors 48 are removed from the corresponding jaw slots 108. If the latch assemblies 64 are already disengaged, the header 22 and header adapter 26 are disengaged by simply lowering the header adapter 26 relative to the header 22 so that the fastener 60b is removed from the hook slot 82 and the rods 54 of the end connectors 48 are removed from the corresponding jaw slots 108.

Still referring to FIGS. 1A-5, each latch assembly 64 is preferably associated with at least one of the end supports 68 to selectively secure the end support 68 to the end connector 48 of the header 22 by providing a latch-actuating control for the operator at a location spaced from the end support 68. As will be discussed, the latch assemblies 64 are operable to releasably secure the harvesting header 22 to the adapter frame 62 when the latch assembly 64 is engaged by the operator. Furthermore, the latch assemblies 64 permit disconnection of the header 22 from the adapter frame 62 when the latch assembly 64 is disengaged by the operator. The illustrated latch assemblies 64 are generally mirror images of one another and each include a handle 120, a vertical rod 122, a linkage 124, a spring 126, and a sliding latch 128.

Turning now to FIGS. 3-5, the latch 128 comprises a unitary plate and includes a latch body and a tab 130 that projects laterally from the latch body. The latch 128 is slidably mounted in the latch slot 112 and is slidable between a closed position (see FIGS. 4 and 5) associated with engagement of latch assembly 64 and an open position (see FIG. 3) associated with disengagement of the latch assembly 64. In the closed position, the latch 128 extends from the jaw 96 to partly span the open face 110. However, it is within the scope of the present invention where the latch 128 entirely spans the open face 110 in the closed position. In the open position, the body of the latch 128 is fully retracted within the jaw 96 to expose the open face 110. However, the latch 128 could be only partly retracted within the jaw 96 in the open position. For instance, in the open position, the latch 128 could extend partly across the open face to a lesser extent compared to when the latch 128 is in the closed position.

It is within the ambit of the present invention where the latch 128 is alternatively shiftable between open and closed positions. For instance, the illustrated latch 128 could be pivotally mounted so as to pivot between open and closed positions.

While each of the end supports 68 of the illustrated header adapter 26 preferably has a corresponding latch 128 mounted thereon, it is within the ambit of the present invention where only one of the end supports 68 has a latch 128. Furthermore, although the center support 70 is preferably devoid of a latch 128, the center support 70 could also have a shiftable latch mechanism that includes a slidable latch 128.

The rod 122 and handle 120 are fixed to one another and are preferably slidable vertically relative to the end support 68 to move the latch 128. The rod 122 presents upper and lower ends 132,134 and includes a pin coupling 136 at the lower end 134. The upper end 132 of the rod 122 is welded to the handle 120. Thus, vertical movement of the handle 120 causes corresponding vertical movement of the pin coupling 136. The illustrated rod 122 is positioned partly within and extends longitudinally through the upright tube 94.

The rod 122 and handle 120 are vertically shiftable between an upper position (see FIG. 3) associated with disengagement of the latch assembly 64 and a lower position (see FIG. 4) associated with engagement of the latch assembly 64. In the upper position, the handle 120 can be moved onto a stop 138 of the end support 68 so that the stop 138 restricts the handle 120 from moving out of the upper position.

The illustrated handle 120 preferably provides a latch-actuating control for the operator. The handle 120, rod 122, and linkage 124 are preferably configured so that the handle 120 is spaced from the jaw 96 (particularly the jaw slot 108) and located adjacent the upper end 98 of the end support 68. However, it is within the ambit of the present invention where the handle 120 is alternatively positioned relative to the jaw 96.

Furthermore, while the illustrated handle 120 moves vertically to actuate the latch 128, the handle 120 could be alternatively shifted for latch actuation. For example, the latch assembly 64 could be configured so that the handle 120 is rotated about a vertical axis or about a lateral axis to drive the latch 128 between open and closed positions.

For some aspects of the present invention, the latch assembly 64 could be devoid of the handle 120 and/or the rod 122. For instance, the header adapter 26 could include a powered drive motor (not shown) that is drivingly attached to the linkage 124 and a remotely-located control actuator (not shown) operably coupled to the drive motor, with the actuator being selectively actuated by the operator. The drive motor could include one of various types of motors, such as a rotating motor (e.g., an electric motor) or a linear motor (e.g., a linear electric motor, a hydraulic cylinder, or a pneumatic cylinder). Furthermore, when the header adapter 26 employs a drive motor and a control actuator, it will be appreciated that the control actuator could be variously configured (e.g., as an electric switch, a hydraulic valve, a pneumatic valve, etc.) to actuate the motor in response to control input by the operator. Furthermore, the control actuator could be variously positioned relative to the end support 68 (e.g., where the control actuator is positioned on the header adapter 26, on the frame 28, in the cab 32, etc.).

Turning to FIGS. 3 and 4, the rod 122 and latch 128 are preferably drivingly connected to one another by the illustrated linkage 124. More particularly, in response to vertical movement of the handle 120, the linkage 124 preferably causes corresponding lateral sliding movement of the latch 128.

The illustrated linkage 124 preferably includes a pivot link 140 and a sliding link 142. The pivot link 140 is unitary and presents opposite ends 144,146. The pivot link 140 is rotatably mounted to the jaw 96 by a pin 148 to form a pivot joint 150 spaced between the ends 144,146. The pivot joint 150 allows the pivot link 140 to rotate about a lateral axis.

The end 146 of the pivot link 140 is pivotally attached to the pin coupling 136 of the rod 122 by a fastener 152 to form a pivot joint 154. As a result, vertical movement of the rod 122 and handle 120 causes corresponding swinging movement of the end 144 of the pivot link 140 about the pivot joint 150.

The sliding link 142 is elongated and includes a rod 156, a pin coupling 158, and a ball coupling 160. The rod 156 presents threaded ends, with the couplings 158,160 being adjustably threaded onto the respective threaded ends. The ball coupling 160 includes a coupling body 162 that presents a spherical socket and a spherical ball 164 rotatably received in the socket.

The pin coupling 158 of the sliding link 142 is pivotally attached to the end 144 of the pivot link 140 with a fastener 152 to form a pivot joint 166 (see FIG. 3). The ball coupling 160 also provides a pivot joint and is pivotally attached to the tab 130 of the latch 128 with a fastener 168 that extends through the ball 164. The ball coupling 160 permits relative pivotal movement between the coupling body 162 and the fastener 168 about each of three independent axes.

The sliding link 142 drivingly interconnects the latch 128 and the pivot link 140. More particularly, swinging movement of the end 144 of the pivot link 140 about the pivot joint 150 causes corresponding sliding movement of the latch 128 along the latch slot 112.

The illustrated linkage 124 transmits movement between the rod 122 and the latch 128 so that downward movement of the handle 120 toward the lower position causes the pivot joint 166 to swing forwardly, with the sliding link 142 causing the latch 128 to slide forwardly. Thus, to engage the latch assembly 64 by moving the latch 128 from the open position to the closed position, the handle 120 is preferably moved from the upper position to the lower position.

Similarly, upward movement of the handle 120 toward the upper position causes the pivot joint 166 to swing rearwardly, with the sliding link 142 causing the latch 128 to slide rearwardly. To disengage the latch assembly 64, the latch 128 is preferably moved from the closed position to the open position by moving the handle 120 from the lower position to the upper position.

While opening of the latch 128 preferably requires actuation of structure other than the latch 128 itself (in the illustrated embodiment, the handle 120), the header adapter 26 could be configured to open the latch 128 by directly actuating the latch. In one such alternative embodiment, the latch could be pivotally mounted to the jaw 96 and normally biased upwardly by a latch spring (not shown) into a closed position where the latch extends across the open face of an alternative jaw slot. The jaw 96 could include a stop (not shown) to prevent the latch from pivoting upwardly from the closed position while permitting the latch to fold downwardly into the jaw slot. If the alternative jaw slot was enlarged to allow the rod 54 to be inserted in the jaw slot while sliding past the folded down latch, the alternative latch and latch spring arrangement could allow automatic securement of the end connector 48 and end support 68 by inserting the rod 54 into the slot and without actuating the handle 120. The alternative latch and latch spring arrangement would automatically bias the latch into the closed position without actuating the handle. In such an alternative embodiment, removal of the end connector 48 from the end support 68 would require the handle to be actuated so as to fold the latch downwardly into an open position.

While the illustrated linkage 124 is preferred, it is within the scope of the present invention where the linkage 124 is alternatively configured. For instance, the pivot link 140 and/or the sliding link 142 could be alternatively sized and/or configured to transmit driving force between the handle 120 and the latch 128. It will also be appreciated that the header adapter 26 could be devoid of linkage 124.

For some aspects of the present invention, the header adapter 26 could include an alternative drive to shift the latch 128 between open and closed positions. For instance, the header adapter 26 could include an alternative drive mechanism, such as a gear drive, to transmit driving force between the handle 120 and the latch 128. Also, the header adapter 26 could include a powered drive motor (not shown) that is drivingly attached to the latch 128. As discussed above, such a drive motor could be operably coupled to a remotely-located control actuator (not shown), with the actuator being selectively actuated by the operator. The drive motor could include one of various types of motors, such as a rotating motor (e.g., an electric motor) or a linear motor (e.g., a linear electric motor, a hydraulic cylinder, or a pneumatic cylinder).

In the illustrated embodiment, the latch assemblies 64 are preferably mounted to and operable with respective end supports 68. However, it is within the ambit of the present invention where only one of the end supports 68 has a latch assembly 64. Furthermore, the header adapter 26 could also have a latch assembly with a shiftable latch operably associated with the center support 70 to selectively open and close the hook slot 82. For instance, the header adapter 26 could include a single latch assembly 64 that is operably associated with only the center support 70 (i.e., where neither of end supports 68 has a latch assembly).

Also in the illustrated embodiment, each latch assembly 64 is independently operable to selectively secure the respective end support 68 to the corresponding one of the end connectors 48 of the header 22 when the latch assembly 64 is engaged. Similarly, the latch assemblies 64 are operable independently of one another to selectively release and permit separation of the respective end support 68 and the corresponding end connector 48 from one another when the latch assembly 64 is disengaged. However, it is within the ambit of the present invention where the latch assemblies 64 are operably interconnected so that actuation of one of the handles 120 causes shifting movement of both of the latches 128 at or around the same time (i.e., where the latches 128 open or close at or around the same time). It will be appreciated that simultaneous opening and closing of the latches 128 could also be provided by an alternative drive mechanism. For instance, each latch 128 could be driven by a corresponding drive motor, with the drive motor being operably coupled to the same control actuator.

The spring 126 is preferably used to urge the latch assembly 64 into the engaged condition. The illustrated spring 126 comprises a coiled tension spring that presents opposite ends 170,172. The spring 126 preferably has a substantially constant spring rate, although the spring 126 could be alternatively configured without departing from the scope of the present invention. The ends 170,172 cooperatively define a relaxed distance (not shown) therebetween when the spring 126 is relaxed (i.e., not stretched). The spring 126 is attached at one end 172 to the pivot link 140 and at the other end to a stud 174 mounted on the jaw 96.

When the latch assembly 64 is engaged, the spring 126 is in a first stretched condition where the ends 170,172 of the spring 126 are stretched to define a first distance D1 (see FIG. 4) greater than the relaxed distance. When the latch assembly 64 is disengaged, the spring 126 is in a second stretched condition where the ends 170,172 of the spring 126 are stretched to define a second distance D2 (see FIG. 3) greater than the first distance D1. Because the spring 126 has a constant spring rate, the spring 126 applies a greater force in the second stretched condition than in the first stretched condition. As a result, the illustrated spring 126 preferably biases the latch 128 closed (i.e., the spring 126 biases the latch assembly 64 toward the engaged condition). However, it is within the scope of the present invention where the spring 126 is alternatively constructed and/or configured. Yet further, the latch assembly 64 could be devoid of the spring 126.

To secure the header 22 to the header adapter 26, the header 22 and header adapter 26 are first aligned along the fore-and-aft direction, as discussed above. Optionally, the latch assembly 64 is disengaged so that the jaw slots 108 are open. The header adapter 26 is then shifted upwardly into engagement with the header 22 so that the hook slot 82 engages the fastener 60*b* and the jaw slots 108 engages the rods 54 of the corresponding end connectors 48. With the header 22 and header adapter 26 engaged with one another, the latch assemblies 64 can then be engaged by moving the handles 120 downwardly into the lower position so as to shift the latches 128 closed. It will also be appreciated that the header adapter 26 can be used to secure the powered chassis 24 to one of multiple other headers (not shown) at any particular time, provided that the other headers have the same configuration of end connectors 48 and center connector 50 has the header 22.

Similarly, the header 22 and header adapter 26 can be selectively detached from one another. Initially, the header 22 and header adapter 26 are detached by first disengaging the latch assemblies 64. The header 22 and header adapter 26 can then be disengaged from each other by lowering the header adapter 26 relative to the header 22 so that the fastener 60*b* is removed from the hook slot 82 and the rods 54 of the end connectors 48 are removed from the corresponding jaw slots 108.

In use, the powered chassis 24 is selectively secured to and removed from the illustrated header 22 using the header adapter 26. With the header adapter 26 mounted to the lift arms 34 and the center cylinder 40, the header 22 is secured by aligning the header 22 and header adapter 26 along the fore-and-aft direction, shifting the header adapter 26 upwardly into engagement with the header 22, and then moving the handles 120 downwardly into the lower position so as to shift the latches 128 closed. Once the header 22 is secured, the windrower 20 can, in the usual manner, be advanced along the ground G to sever a swath of standing forage plants and to lay the severed forage material into a windrow (not shown).

When the operator is ready to remove the header 22 from the windrower 20 (e.g., to transport the windrower 20 to or from a field or to attach another header), the header 20 is removable by detaching the header 22 and the header adapter 26 from each other. Again, the header 22 and header adapter 26 are detached by disengaging the latch assemblies 64 and then lowering the header adapter 26 relative to the header 22 so that the header adapter 26 and the header 22 are disengaged.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

What is claimed is:

1. An agricultural work vehicle comprising:
   a powered chassis operable to be driven across the ground, wherein said powered chassis includes a chassis frame, a pair of laterally-spaced lift arms, a pair of end lift cylinders, and a central link located laterally between the lift arms, wherein each lift arm is pivotably mounted to the chassis frame and is connected with a respective one of said pair of end lift cylinders so that each said lift arm is configured to swing about a first lateral pivot axis by said end lift cylinder;
   a harvesting header shiftably supported by and movable with the powered chassis forwardly across the ground to cut forage plants, said harvesting header including a header frame with a pair of end connectors and a center connector located between the end connectors, wherein each of the end connectors includes a rod; and
   a quick-attachment header adapter shiftably supported by the powered chassis and configured to selectively support the harvesting header, said header adapter including an adapter frame and a selectively actuatable latch assembly supported on the adapter frame,
   said adapter frame including a pair of laterally spaced end supports, each associated with one of the end connectors of the header frame, and a center support located laterally between the end supports and associated with the center connector of the header frame, with the connectors being at least in part supported on the supports, with said center support being attached to the central link and each of said end supports being attached to a corresponding one of the lift arms with a pivot joint allowing the header adapter to pivot relative the lift arms about a second lateral pivot axis offset from said first lateral pivot axis, wherein said one end support includes a jaw that presents a jaw slot, said jaw slot including an open face that permits the jaw slot to slidably receive the rod of the one end connector,
   said latch assembly being associated with at least one of the supports to releasably secure the harvesting header to the adapter frame when the latch assembly is engaged and permit disconnection from the adapter frame when the latch assembly is disengaged, wherein said latch assembly secures the rod of the one end connector at least partly within the jaw slot when the latch assembly is engaged and permits removal of the rod from the jaw slot when the latch assembly is disengaged.

2. The agricultural work vehicle as claimed in claim 1, wherein said latch assembly is associated with one of the end supports to secure the one end support to a corresponding one of the end connectors when the latch assembly is engaged and to permit separation of the one end support and the one end connector from one another when the latch assembly is disengaged.

3. The agricultural work vehicle as claimed in claim 1, wherein said latch assembly includes a latch shiftably mounted to the jaw and shiftable between a closed position associated with engagement of latch assembly and an open position associated with disengagement of the latch assembly, said latch at least partly extending across the open face in the closed position and being at least partly retracted from the open face in the open position.

4. The agricultural work vehicle as claimed in claim 3, wherein said latch assembly further includes a spring that urges the latch toward the closed position and a latch handle spaced from the latch and a linkage that operably connects the latch handle and the latch.

5. The agricultural work vehicle as claimed in claim 4, wherein:
   said latch is handle spaced vertically and rearwardly from the latch;
   said latch handle and said latch are slidable in respective sliding directions transverse to one another; and
   said linkage includes a pivotal link causing one of the latch handle and the latch to slide in response to sliding movement of the other one of the latch handle and the latch.

6. The agricultural work vehicle as claimed in claim 1, wherein said end supports being spaced forwardly of the center support and attached to the end connectors in a supporting position underneath the header.

7. The agricultural work vehicle as claimed in claim 6, wherein:
   said header adapter including a beam that extends laterally to interconnect the end supports and the center support; and
   said end supports depending from the beam so that the end supports are spaced below the center support.

8. The agricultural work vehicle as claimed in claim 7, wherein said center support includes a hook that presents an open hook slot, said hook slot opening upwardly to slidably receive the center connector.

9. The agricultural work vehicle as claimed in claim 1, further comprising:
   another latch assembly, each of said latch assemblies being associated with a respective one of the end connectors to secure the end supports to corresponding ones of the end connectors when the latch assemblies are engaged and to permit separation of the end supports and the end connectors from one another when the latch assemblies are disengaged.

* * * * *